(12) United States Patent
Lush

(10) Patent No.: US 6,951,188 B1
(45) Date of Patent: *Oct. 4, 2005

(54) SQUIRREL TEASING HANGER ASSEMBLY FOR A BIRD FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

This patent is subject to a terminal disclaimer.

(21) Appl. No.: 10/827,033

(22) Filed: Apr. 19, 2004

(51) Int. Cl.$^7$ .............................................. A01K 39/01
(52) U.S. Cl. ..................................... 119/57.9; 119/52.3
(58) Field of Search .......................... 119/51.01, 52.3, 119/57.1, 57.9, 52.4, 57.92; D30/121, 124, D30/125

(56) References Cited

U.S. PATENT DOCUMENTS

| | | | |
|---|---|---|---|
| 4,541,362 A | 9/1985 | Dehls | 119/51 R |
| 5,048,461 A | 9/1991 | Wessner | 119/52.3 |
| 5,105,765 A | 4/1992 | Loken | 119/57.9 |
| 5,297,503 A | 3/1994 | Hibbard | 119/57.9 |
| 5,392,732 A | 2/1995 | Fry | 119/57.9 |
| 5,471,951 A | 12/1995 | Collins | 119/57.9 |
| 5,690,056 A | 11/1997 | Korb | 119/52.3 |
| 5,720,238 A | 2/1998 | Drakos | 119/57.9 |
| 5,868,101 A * | 2/1999 | Marshall | 119/428 |
| 6,119,627 A | 9/2000 | Banyas et al. | 119/57.9 |
| 6,341,576 B1 * | 1/2002 | Cathell et al. | 119/52.3 |
| 6,363,891 B1 * | 4/2002 | Marshall | 119/719 |
| 6,378,458 B1 * | 4/2002 | Boyd | 119/52.3 |
| 6,408,789 B1 * | 6/2002 | Hsiao | 119/57.9 |
| 6,418,878 B1 * | 7/2002 | Cathell et al. | 119/52.3 |
| 6,619,229 B1 * | 9/2003 | Lush | 119/57.9 |
| 6,655,319 B2 * | 12/2003 | Marshall | 119/428 |

* cited by examiner

*Primary Examiner*—T. Nguyen
(74) *Attorney, Agent, or Firm*—Thomte, Mazour & Niebergall; Dennis L. Thomte

(57) ABSTRACT

A squirrel teasing hanger assembly for a bird feeder emits sounds or illuminates lights when a squirrel or large bird alights on the bird feeder attached to a lower support of the hanger assembly.

11 Claims, 2 Drawing Sheets

SQUIRREL TEASING HANGER ASSEMBLY FOR A BIRD FEEDER

BACKGROUND OF THE INVENTION

1. Field of the Invention

This invention relates to a squirrel teasing hanger assembly for a bird feeder or the like and more particularly to a squirrel teasing hanger for a bird feeder which is activated by the weight of the squirrel thereon or which may be activated by a remote control. More particularly, the teaser hanger assembly emits sounds or illuminates lights.

2. Description of the Related Art

Several types of bird feeders have been designed for preventing unwanted animals such as squirrels from eating the bird food in the feeder. Little prior art exists on rodent repelling hangers where various types of plants, feeders and bird shelters may be hung therefrom. One type of bird feeder has weight-sensitive tiltable perches thereon so when a squirrel or large bird lands on the perch, the perch moves and dislodges the animal. This type of bird feeder is shown in Loken U.S. Pat. No. 5,105,765; Wessner U.S. Pat. No. 5,048,461; and Dehls U.S. Pat. No. 4,541,362.

Another type of device uses a shocking system to send an electric impulse into the unwanted animal when that animal attempts to eat from the feeder. This type of device is shown in Fry U.S. Pat. No. 5,392,732 and Collins U.S. Pat. No. 5,471,951.

Still another type of repelling device uses weight-sensitive devices to discourage the unwanted animal from feeding from the feeder. This device shuts off the food supply when a heavy animal or bird lands upon the perch. This type of device is taught in Drakos U.S. Pat. No. 5,720,238.

Yet another type of repelling device to which the present invention pertains senses the excessive weight of a squirrel or unwanted bird and removes the unwanted animal at a predetermined point in time. This type of device is taught in Hibbard U.S. Pat. No. 5,297,503; Korb U.S. Pat. No. 5,690,056; and Banyas U.S. Pat. No. 6,119,627.

Although the squirrel repelling devices of the prior art are noteworthy, there are many instances when a person does not wish to repel squirrels from the bird feeder but wish to tease or play with the same without necessarily repelling the squirrel from the apparatus.

SUMMARY OF THE INVENTION

A squirrel teasing hanger assembly for a bird feeder or the like is disclosed comprising a housing having upper and lower ends with a lower support extending downwardly from the lower end of the housing which is movable between upper and lower positions with respect to the housing. The lower support is adapted to have a bird feeder or the like suspended therefrom. An upper support extends upwardly from the upper end of the housing for attachment to a supporting member such as a tree branch or the like. A sound-producing device is mounted in the housing and is powered by a battery-powered circuit in the housing. The lower support is suspended from a load cell mounted in the housing. The load cell is electrically connected to a battery powered printed circuit board including a microprocessor whereby the sound-producing device will be activated when the load cell senses the weight of a squirrel or large bird on the bird feeder. The sound-producing device will emit a sound such as that of a cat, dog, eagle, hawk, etc. Additionally, a light-emitting device is provided on the housing which will be illuminated to startle the squirrel on the bird feeder. For enjoyment purposes, the sound-producing device and the light-emitting device may be actuated by a remote control circuit.

It is therefore a principal object of the invention to provide a squirrel teasing hanger assembly for a bird feeder or the like.

A further object of the invention is to provide a teasing hanger assembly for a bird feeder or the like which is actuated when a squirrel or large bird is on the bird feeder.

Yet another object of the invention is to provide a squirrel teasing hanger assembly for a bird feeder or the like which is remotely controlled.

Still another object of the invention is to provide a squirrel teasing hanger assembly for a bird feeder or the like which emits sounds when the weight of a squirrel or bird on the bird feeder actuates the same.

These and other objects will be obvious to those skilled in the art.

DESCRIPTION OF THE PREFERRED EMBODIMENT

Figure 1:
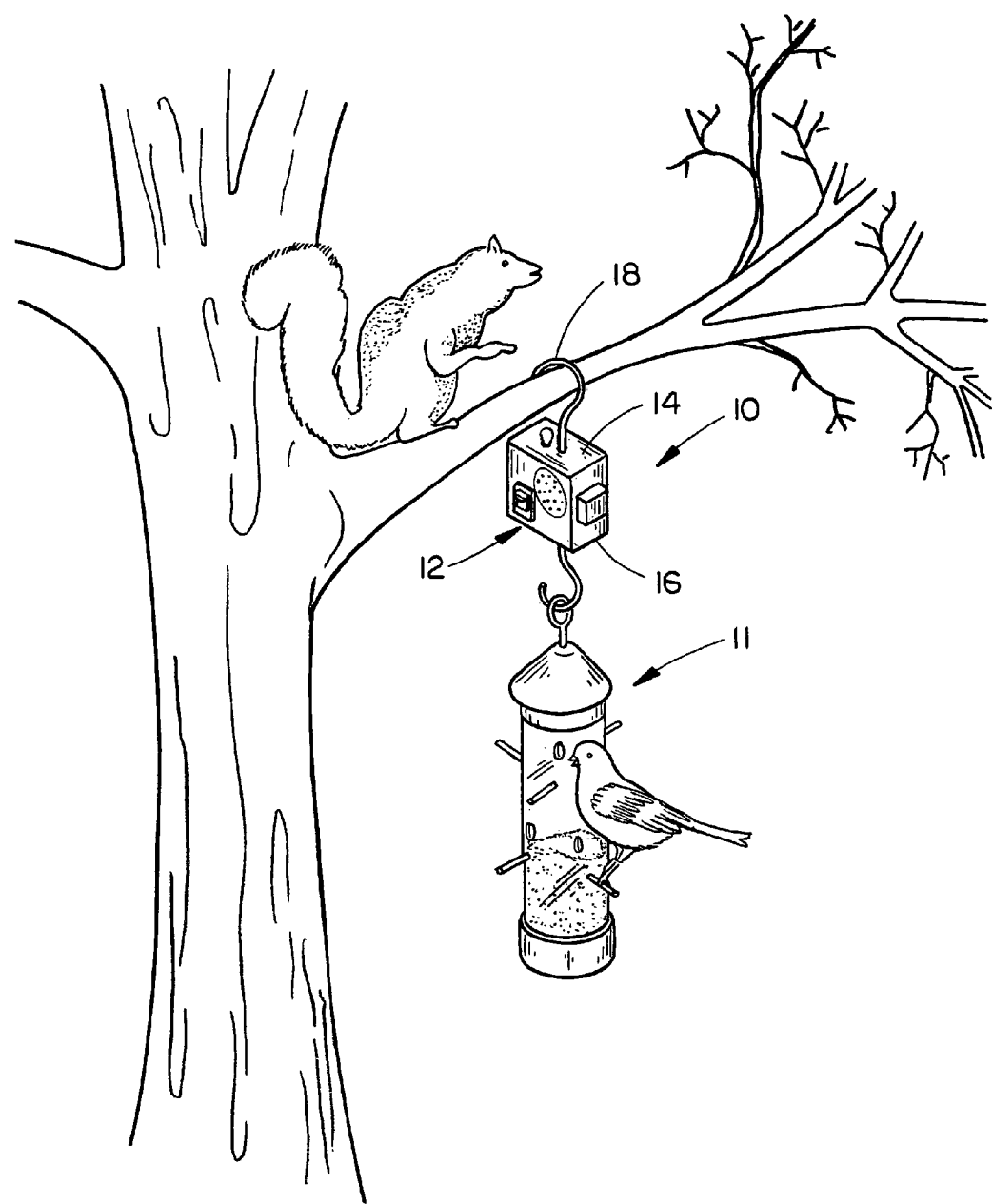
FIG. 1 is a perspective view of the present invention positioned between a tree limb and a bird feeder.
Figure 2:
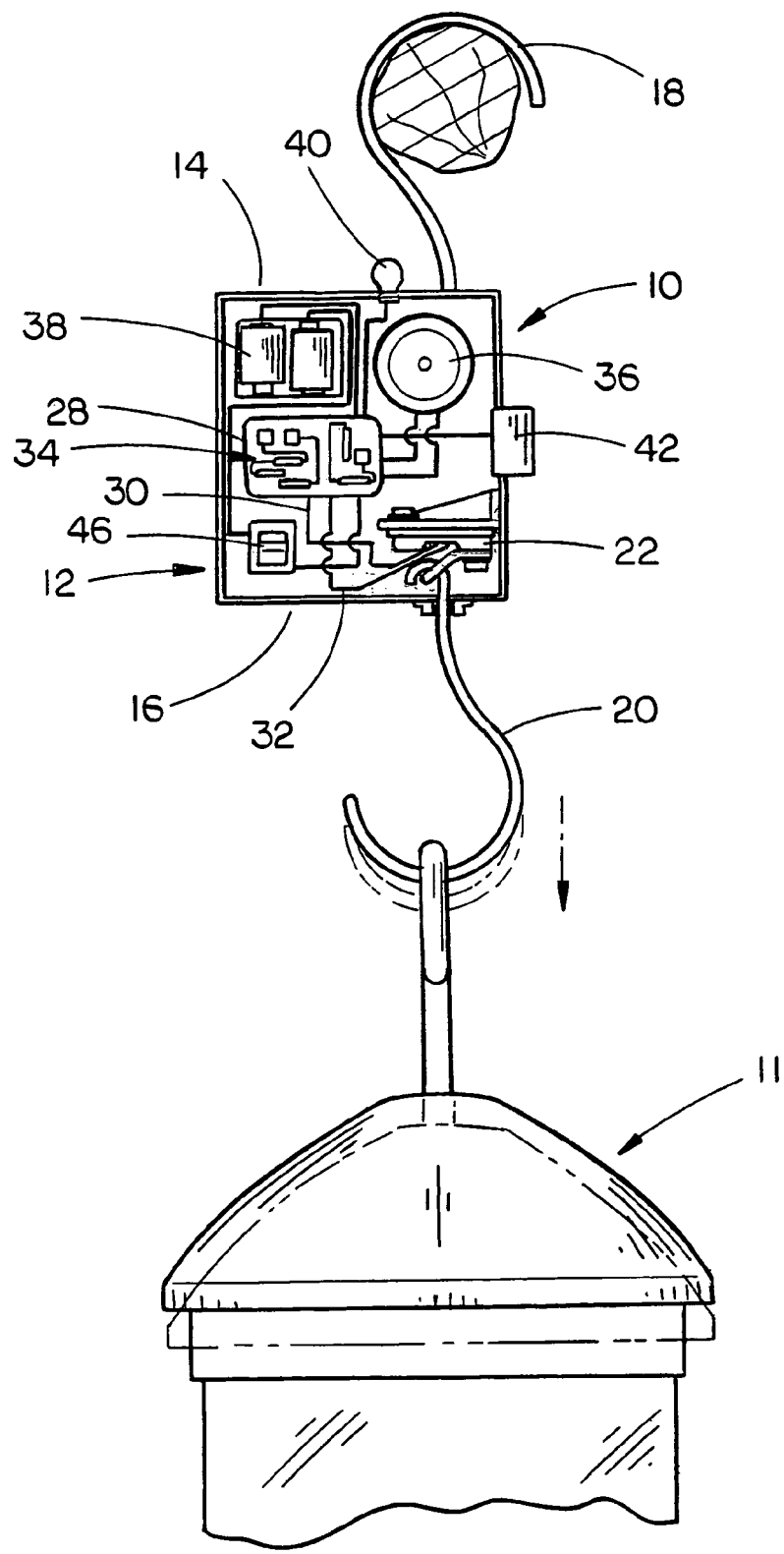
FIG. 2 is a side view illustrating the invention with portions thereof cut away to more fully illustrate the invention.

The squirrel teasing hanger assembly for a bird feeder or the like of this invention is referred to generally by the reference numeral 10 which is designed to support a bird feeder 11 having food therein. The hanger assembly 10 generally includes an enclosed housing 12 having an upper end 14 and a lower end 16. An upper hook or support 18 is secured to the housing and extends upwardly therefrom for mounting the same on a tree branch or the like such as illustrated in FIGS. 1 and 2.

The numeral 20 refers to a lower support in the form of a hook or the like to which the bird feeder 11 may be connected. Preferably, the lower support 20 is constructed of an electrically conductive metal material for a purpose to be described hereinafter. Lower support 20 is connected to a load cell 22 of conventional design. The load cell may be a S-load cell, a beam load cell, or any other type of load cell available on the market. The load cell 22 is conventionally connected by leads 30 and 32 to a conventional circuit board 28 including a microprocessor in conventional fashion.

The numeral 34 refers to a sound-producing mechanism of conventional construction which when activated emits sounds through a speaker 36 provided in the housing 12. The circuit board and the circuitry associated therewith are powered by batteries 38. The numeral 40 refers to a light emitting device such as a light bulb or the like which is activated at the same time the sound-producing mechanism 34 is activated. The numeral 42 refers to a conventional remote control receiver which is connected to the circuitry for activating the circuitry upon receiving a signal from a conventional remote control. An on-off switch 46 is also provided.

The load cell 22 is calibrated such that when a filled bird feeder 11 is supported on the lower support 20, the circuit will be open. If a predetermined weight is placed on the bird feeder 11, such as a squirrel or large bird, the load cell 22 will activate the circuit board 28. If the on-off switch 46 is in the "on" position, the sound-producing mechanism 34 and the light-emitting device 40 may be remotely activated. If the on-off switch is "on," the weight of a squirrel or large bird on the bird feeder 11 will activate the sound-producing mechanism 34 and the light 40. Preferably, the sound-producing mechanism 34 emits the sound of a cat, dog, eagle, hawk, or other animal. Thus, when a squirrel is on the bird feeder 11, the squirrel is teased or startled by the action of the sound-producing mechanism 34 or the light 40.

Thus it can be seen that a novel squirrel teasing hanger assembly for a bird feeder or the like has been provided which accomplishes at least all of its stated objectives.

I claim:

1. A squirrel or bird teasing hanger assembly, for a bird feeder, said hanging assembly comprises:
   a housing having upper and lower ends;
   a lower support extending downwardly from said lower end of said housing;
   said support adapted to have a bird feeder suspended therefrom;
   an upper support extending upwardly from said upper end of said housing for attachment to a supporting member;
   a sound-producing device mounted on said housing;
   a battery-powered circuit in said housing for powering said sound-producing device;
   said lower support having a load cell connected thereto;
   said load cell being electrically connected to said circuit;
   said sound-producing device being automatically activated when said load cell senses a predetermined weight on said bird feeder when a squirrel or large bird moves onto the bird feeder.

2. The squirrel teasing hanging assembly of claim 1 wherein a remote control receiver is electrically connected to said battery-powered circuit whereby said sound-producing device may also be activated when said remote control receiver receives a signal from a remote control.

3. The squirrel teasing hanging assembly of claim 1 wherein said battery-powered circuit also includes a manual on-off switch.

4. The squirrel teasing hanging assembly of claim 1 wherein a light-emitting device is mounted on said housing and is electrically connected to said battery-operated circuit.

5. A squirrel or bird teasing hanger assembly, for a bird feeder, said hanging assembly comprises:
   a housing having upper and lower ends;
   a lower support extending downwardly from said lower end of said housing which is movable between upper and lower positions with respect to said housing;
   said support adapted to have a bird feeder suspended therefrom;
   an upper support extending upwardly from said upper end of said housing for attachment to a supporting member;
   a light-emitting device on said housing;
   a battery-powered circuit in said housing for powering said light emitting device;
   said lower support having a load cell connected thereto;
   said load cell being electrically connected to said circuit;
   said light emitting device being automatically activated when said load cell senses a predetermined weight on said bird feeder when a squirrel or large bird moves onto the bird feeder.

6. The squirrel teasing hanging assembly of claim 5 wherein a remote control receiver is electrically connected to said battery-powered circuit whereby said light emitting device may also be activated when said remote control receiver receives a signal from a remote control.

7. The squirrel teasing hanging assembly of claim 5 wherein said battery-powered circuit also includes a manual on-off switch.

8. The squirrel teasing hanging assembly of claim 1 wherein said sound-producing device emits the sound of an animal.

9. The squirrel teasing hanging assembly of claim 1 wherein said sound-producing device emits the sound of a hawk or eagle.

10. The squirrel teasing hanging assembly of claim 1 wherein said sound-producing device emits the sound of a cat.

11. The squirrel teasing hanging assembly of claim 1 wherein said sound-producing device emits the sound of a dog.

* * * * *